United States Patent [19]

Topel et al.

[11] Patent Number: 4,922,072
[45] Date of Patent: May 1, 1990

[54] WIRE CONNECTING METHOD

[75] Inventors: Edward C. Topel, Worth; Mario Garritano, Oak Lawn, both of Ill.

[73] Assignee: Methode Electronics, Inc., Chicago, Ill.

[21] Appl. No.: 210,000

[22] Filed: Jun. 22, 1988

[51] Int. Cl.⁵ .................. B23K 11/16; B23K 11/00
[52] U.S. Cl. .................. 219/56.1; 219/56.22; 219/78.01; 228/173.5; 228/179
[58] Field of Search .................. 219/56, 56.1, 56.22, 219/78.01, 78.13, 78.15, 117.1, 105; 228/173.5, 179; 29/860, 872, 873

[56] References Cited

U.S. PATENT DOCUMENTS

| | | | |
|---|---|---|---|
| 994,818 | 6/1911 | Cleveland | 228/173.5 |
| 2,127,685 | 8/1938 | Greulich | 219/105 |
| 3,259,969 | 7/1966 | Tessmann | 219/100 |
| 3,313,911 | 4/1967 | Seeloff | 219/105 |
| 3,333,083 | 7/1967 | Brunstetter | 219/56.22 |
| 3,777,111 | 12/1973 | Ehringer | 219/105 |
| 3,916,140 | 10/1975 | Clewis | 219/105 |

Primary Examiner—Bruce A. Reynolds
Assistant Examiner—Scott A. Rogers
Attorney, Agent, or Firm—Allegretti & Witcoff, Ltd.

[57] ABSTRACT

A method of connecting a relatively large diameter, multistrand wire with a relatively small diameter wire. The method comprises: (1) Flattening a portion of the large diameter, multistrand wire into a body of reduced first transverse dimension and an increased second transverse dimension. Simultaneously, one heat welds the strands of the body into a unitary, coherent mass. (2) One cuts away outer portions of the unitary, coherent mass to reduce the increased second transverse dimension of the mass produced by the flattening step. (3) Then, one heat welds the unitary, coherent mass to the relatively small diameter wire.

16 Claims, 2 Drawing Sheets

U.S. Patent
May 1, 1990
Sheet 1 of 2
4,922,072
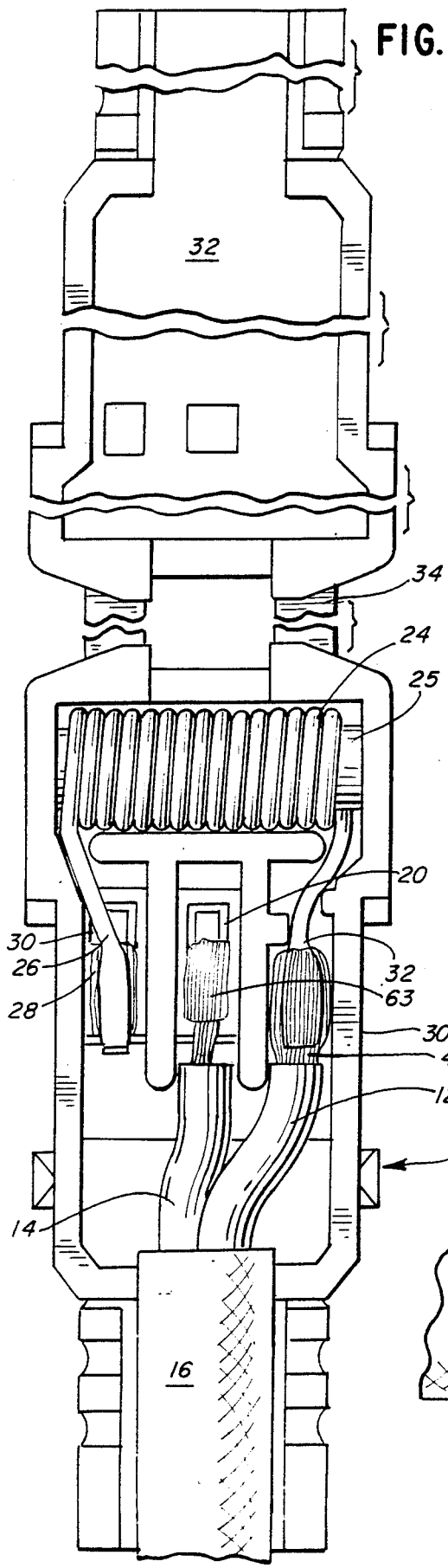
FIG. 1
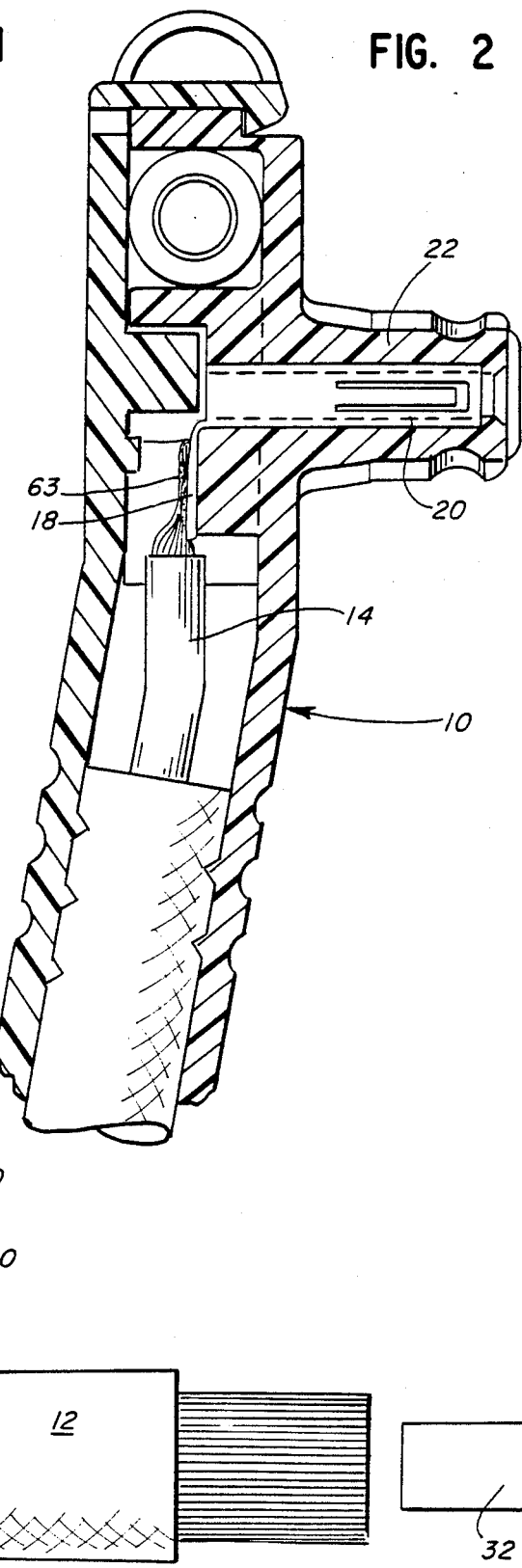
FIG. 2
FIG. 3

WIRE CONNECTING METHOD

BACKGROUND OF THE INVENTION

In the technology of electrical components, it is frequently necessary to make connection between the end of a multistrand wire of relatively large diameter and a small prong of a terminal or the like which is of lesser diameter. Experts in the prior art currently feel that it is not feasible to weld a large-diameter, multistrand wire to a significantly smaller-diameter prong or wire to make a firm, reliable connection. Accordingly, in such circumstances it has been generally necessary to use a solder connection.

A disadvantage of solder connections is that they are less reliable than welded connections, particularly the electrical resistance type of welded connections. The failure rate of such soldered connections is undesirably high.

In accordance with this invention, a method is provided for heat-welding together large-diameter, multistrand wires with smaller diameter wires or prongs, to provide a welded connection of improved reliability over solder connections, in a manner which up to the present time was deemed not feasible by experts in the current state of the welding art.

DESCRIPTION OF THE INVENTION

In this invention, a method is provided for connecting a relatively large diameter, multistrand wire with a relatively small diameter wire. The method comprises at least three steps, as follows:

1. One flattens a portion of the large-diameter, multistrand wire into a body of reduced first transverse dimension and an increased second transverse dimension, to provide a flat, wide section of multistrand wire which may extend either vertically, horizontally, or at an angled direction to the vertical. This flattened body is then heat welded in a conventional manner so that the individual strands of the body are welded into a unitary, coherent mass. This may be accomplished by conventional heat welding apparatus, but also, if desired, an ultrasonic welding system may be used.

2. One then cuts away outer portions of the flattened, unitary, coherent mass to reduce the increased second transverse dimension of the mass produced by the flattening step. Preferably, one cuts edges of the flattened, unitary mass away to reduce the increased second transverse dimension of the coherent mass to a value of no more than its original value prior to the flattening step, and typically even less. Specifically, one reduces the increased second transverse dimension of the flattened mass down to a dimension which approximates the diameter of the relatively small diameter wire which is to be welded to the mass. Preferably the diameter of the relatively small diameter wire used herein relates to the diameter of the relatively large diameter wire in its original configuration by a ratio of about 1:3 to 1:1.5. The term "diameter" and the like refers to the actual diameter of a conductive wire or wires, and does not include any insulation or the like surrounding the wire or wires.

3. Finally, one heat welds the trimmed, unitary, coherent mass to the relatively small diameter wire, preferably using a generally conventional electrical resistance welding process, but alternatively using another type of welding process such as ultrasonic welding, if desired. The term "wire" as used herein is intended to include terminal or connector prongs and the like, or multiple strand wire.

Preferably, for small wires, the electrical resistance welding process of step 1 above utilizes direct electric current of about 30 to 50 milliseconds duration, at about 1,000 to 1,200 amps and about 3 to 5 volts. During this welding process of step 1, the large diameter wire may be flattened during the welding at a pressure of about 1,000 to 4,000 psi. The above specific parameters are preferred for processing the relatively large diameter, multistrand wires having a diameter of about 1 or 2 millimeters, so that the total area of the large diameter wire that is flattened in step 1 is only on the order of 0.01 to 0.04 square inch. Thus the actual force imposed to flatten the relatively large diameter wire is rather low.

Alternatively, alternating current may be used as desired for welding. The various parameters of the welding steps 1 and 3 above are of course adjusted in a manner readily ascertainable to those skilled in the art a the circumstances demand.

The unitary, coherent mass is heat welded in step 3 above to the relatively small diameter wire preferably by electrical resistance welding which utilizes a direct current electrical pulse having an energy of about 200 to 300 watt seconds. For example, step 3 may be performed with small diameter wires as described above with a conventional welder such as a Unitek 250 power supply having a Unitek weld head, model 132a.

Accordingly, by the invention of this application, strong, reliable welds may be achieved between wires of significantly different diameters, contrary to the common perception of experts in the prior art. The relatively small diameter wire may be either of single strand or multiple strand nature, but is preferably a single strand wire section or prong. Also, the method of this invention is typically practiced on the stripped end of relatively large diameter, multistrand wire, but it also may be practiced to join an intermediate section of relatively large diameter, multistrand wire, spaced from the ends thereof, to a central portion or an end of relatively small diameter wire.

DESCRIPTION OF DRAWINGS

Referring to the drawings, FIG. 1 is a plan view of a connector member having relatively large-diameter multistrand wire welded to relatively small diameter prongs by the method of this invention;

FIG. 2 is an elevational view of the connector of this application;

FIG. 3 is an enlarged plan view of the end of a large, multistrand wire and one of the connected prongs prior to the welding step;

DESCRIPTION OF SPECIFIC EMBODIMENT

Figure 4:
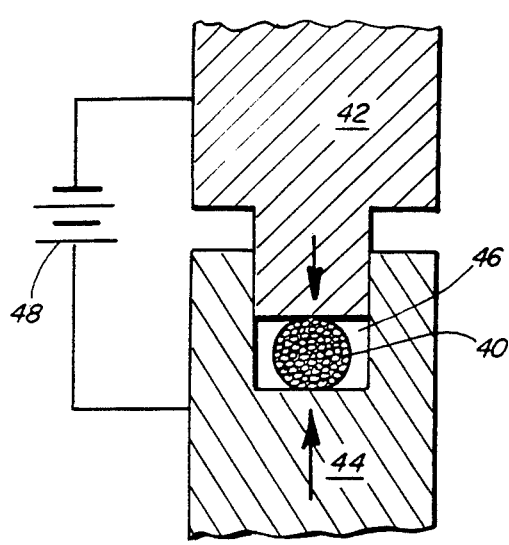
FIG. 4 is a schematic illustration of the first step of the method of this application, showing the relatively large-diameter, multistrand wire portion being flattened and heat welded into a unitary mass.

FIGS. 1 and 2 disclose a connector 10, known as a "squib connector" for terminating two electric wires 12, 14 wrapped in the same cable coating 16. Electric wire 14 communicates directly with terminal 18 which, in turn defines a hollow, tubular angled section 20 extending in perpendicular relation with the remainder of terminal 18 out of side port 22. Thus, terminal section 20 may receive a prong or pin of another electrical member to permit electrical connection with cable 14.

Cable 12 connects at its end with choke coil 24 at one end thereof. Choke coil 24 surrounds ferrite core 25. The other end of choke coil 24 defines a prong 26 which is welded to another terminal 28 of the general design of terminal 18. Terminal 28 carries a hollow tubular receptable 30 of a type similar to receptable 20. Receptable 30 also extends through port 22 to permit a prong to enter into electrical connection with choke coil 24 and its connected cable 12.

Casing 30 may be made of plastic, and is integrally formed with casing top 32 which can bend down about plastic hinge 34 to lock with casing 30 and to enclose the electrical components therein.

While the end prong 26 of choke coil 24 can be resistance welded to terminal 28 by an electrical impulse in conventional manner, because the respective parts may be of comparable diameters, the same does not hold true for the connection between wire 14 and terminal 18, and the connection between wire 12 and prong 32 of choke coil 24. In those two circumstances, it is necessary to bring into permanent electrical connection the end of a relatively large-diameter, multistrand wire and a relatively thin, single prong or wire end. Up to the present time, it has been deemed not feasible by experts to effectively weld such members together in end-to-end relation by a heat-welding system where only generated heat is used to make the connection. Accordingly, prior art versions of the squib connector shown (manufactured by the German subsidiary of Amphenol) are soldered together A well known problem of this is that solder connections are not as reliable as heat welded connections, and thus the reliability of the overall product is reduced. In certain new technologies such as the automobile air bag design, it is close to unacceptable to have connector components that are subject to even a low percentage of failure, since such failure can result in the failure of air bag deployment in an accident. Thus, squib connectors of the prior art having solder connections, which are used in air bag systems, are distinctly inferior and undesirable.

In acccordance with this invention, a method is shown for providing reliable welding between larger diameter, multistrand wires and small, solid prongs.

Referring to FIGS. 3 through 7, FIG. 3 shows the stripped end 40 of relatively large-diameter, multistrand wire portion 12, in spaced relation with end prong 32 of coil 24, prior to welding those members together. Typically, the various members can be welded together prior to installation in the housing 30 of squib connector 10. It can be seen that the diameter of the bundle of multistrand wires 40 is substantially greater than the diameter of prong 32, which generally results in a conclusion from experts in prior art welding techniques that a good heat weld cannot be achieved. In such circumstances, the typical recommendation of the prior art is to solder the two parts together.

In accordance with this invention and a shown in FIG. 4, one places multistrand wire end 40 into an electrically conductive, two piece die 42, 44, in which wire bundle end 40 within recess 46 can be pressed and flattened by interaction between die parts 42, 44 at a pressure of about 20 pounds per 0.01 square inch of the area of the pressed, flattened mass. The effect of this, of course, is to decrease the height (as shown in FIG. 4) of wire bundle end 40 and to increase its width, whereby the wire mass typically occupies the entire width of recess 46, and the individual wire strands are firmly pressed together. Simultaneously therewith, direct electric current from electric circuit and power source 48 is provided, with die portions 42, 44 being made of electrically conductive metal. A pulse of direct electric current may be used, typically of about 40 milliseconds duration and, for a flattened wire end mass of approximately 0.02 square inch, a current of about 1100 amps and 3 to 4 volts. By this process, with such a current or an appropriately modified electrical pulse to account for differing conditions and circumstances one can weld the individual wires of flattened multistrand wire end 40 together into a unitary mass 40a, as particularly shown in FIG. 5.

Following this, as another step in the process of this invention, one cuts away the outer portions 50 along line 52 by any conventional cutter means. Thus, only inner portion 54 of the fused, welded wire mass 40a remains carried on wire 12, while the peripheral portion 50 of the fused wire mass is removed. FIG. 6 shows the inner, fused wire mass 54 after removal of outer, fused portion 56 along line 52, but axially rotated 90 degrees from the view of FIG. 5.

Figure 5:
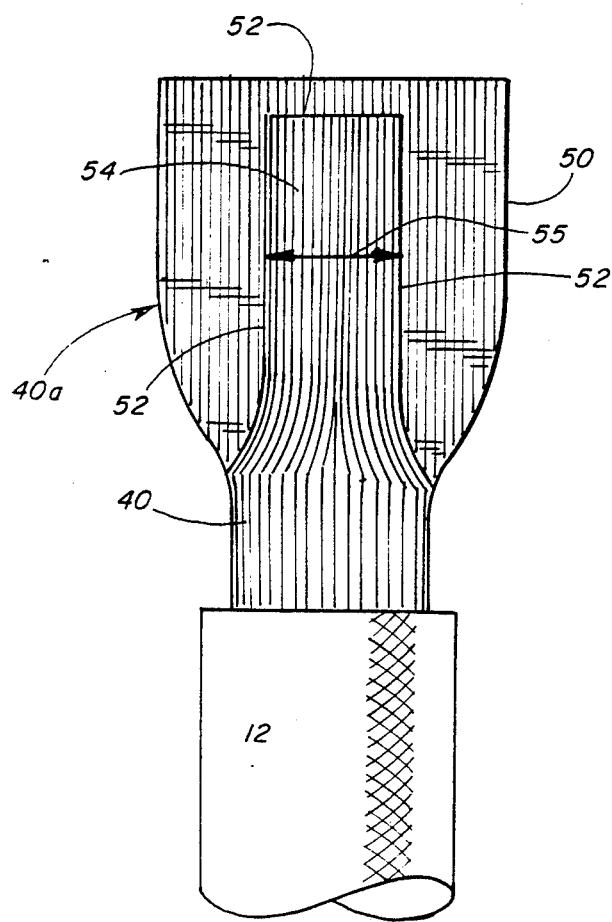
FIG. 5 is an enlarged, plan view of the relatively large-diameter wire end being processed in accordance with step 2 of this invention.
Figure 6:
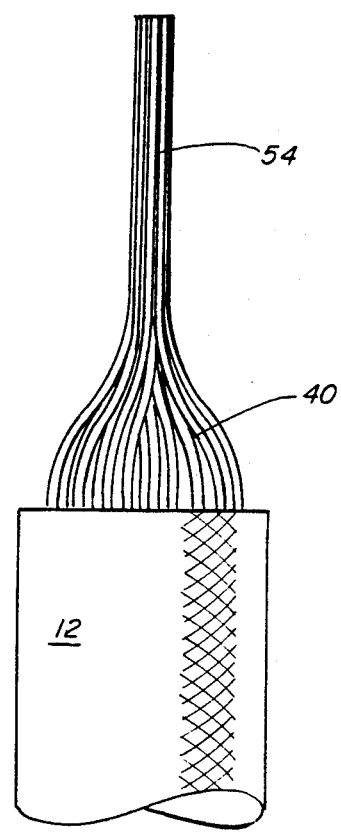
FIG. 6 is a plan view similar to FIG. 5 but showing the relatively large diameter wire rotated axially by 90 degrees.

Now, multistand wire end 40 carries at its outermost end a fused wire mass 54, in which every wire of bundle 40 participates, typically of partially rectangular shape at the outermost end as shown in FIG. 5. Such a fused mass 54 serves as a good site for heat welding and particularly electrical resistance welding. The cut width 55 of fused mass 54 preferably approximates the corresponding width of the relatively small diameter wire, i.e., prong 32.

Figure 7:
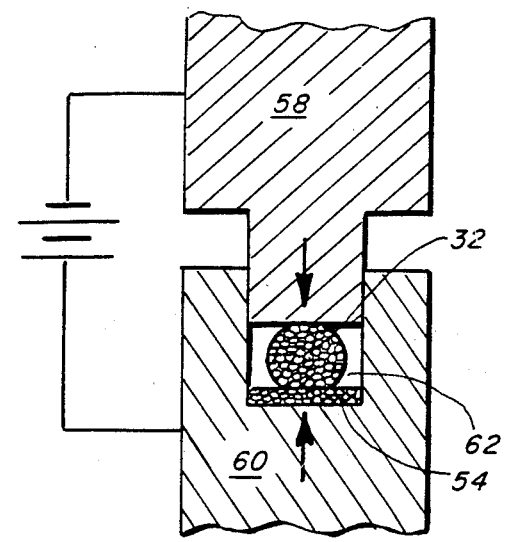
FIG. 7 is a schematic view of step 3 of the method of this invention, showing the unitary, coherent mass being heat welded to the relatively small diameter wire.

Hence, as a subsequent step of the method of this application, shown in FIG. 7, fused mass 54 may be placed in side-by-side, abutting relation with prong 32 of coil 24 in another two piece die system 58, 60 in which the two members 32, 54 are pressed together within recess 62 and welded with a burst of stored electrical energy. Specifically, the Unitek power supply and specific weld head as described above may be used for this process, to provide a strong, reliable welded connection between wire 12 and coil 24.

In similar manner, a welded connection may be provided between a stripped end 63 of multistrand wire 14 and terminal 18, while a typically conventional welding process takes place between prong 26 and terminal 28. After the welding steps have been completed, the connected members are installed in housing 30 of the squib connector, and casing top 32 is closed to complete the manufacturing process.

The welding process of this invention may be used in any of a wide variety of manufacturing processes for any desired electrical, electronic or other types of components, whereever it is desired to heat weld together a relatively large diameter, multistrand wire with a relatively small diameter wire, to achieve the desired reliability and strength of a good heat weld and to achieve advantages over corresponding prior art connections which have been previously used in such circumstances. The respective welded wires do not need to be of circular cross-section in their original form, but may be of other, appropriate shape.

The above has been offered for illustrative purposes only, and is not intended to limit the scope of the invention of this application, which is as defined in the claims below.

That which is claimed is:

1. The method of connecting a relatively large diameter, multistrand wire with a relatively small diameter wire, which comprises:
    flattening a portion of said large diameter, multistrand wire into a body of reduced first transverse dimension and an increased second transverse dimension, and heat welding the strands of said body into a unitary, coherent mass;
    cutting away outer portions of said unitary, coherent mass to reduce the increased second transverse dimension of said mass produced by said flattening step; and
    heat welding said unitary, coherent mass to said relatively small diameter wire.

2. The method of claim 1 in which the body is heat welded into a unitary, coherent mass by electrical resistance welding.

3. The method of claim 2 in which said resistance welding utilizes direct electric current of 30 to 50 milliseconds duration, at about 1000 to 1200 amps and about 3 to 5 volts.

4. The method of claim 3 in which said large diameter wire is flattened during said welding at a pressure of about 1000 to 4000 psi.

5. The method of claim 1 in which said unitary, coherent mass is heat welded to said relatively small diameter wire by electrical resistance welding 6. The method of claim 5 in which said electrical resistance welding utilizes an electrical pulse having an energy of about 200 to 300 watt seconds.

7. The method of claim 1 in which the outer portions of the coherent mass are cut away to reduce the increased second transverse dimension of said coherent mass to a value of no more than its original value prior to said flattenting step.

8. The method of claim 1 in which the mass per unit length of said relatively small diameter wire relates to the mass per unit length of the relatively large diameter wire by a ratio of about 1:3 to 1:1.5.

9. The method of connecting a relatively large diameter, multistrand wire with a relatively small diameter wire, which comprises:
    flattening a portion of said large diameter, multistrand wire into a body of reduced first transverse dimension and an increased second transverse dimension, an electrical resistance welding the strands of said body into a unitary, coherent mass;
    cutting away outer portions of said unitary, coherent mass to reduce the increased second transverse dimension of said mass produced by said flattening step; and
    electrical resistance welding said unitary, coherent mass to said relatively small diameter wire.

10. The method of claim 9 in which the outer portions of the coherent mass are cut away to reduce the increased second transverse dimension of said coherent mass to a value of no more than its original value prior to said flattening step.

11. The method of claim 10 in which the mass per unit length of said relatively small diameter wire relates to the mass per unit length of the relatively large diameter wire by a ratio of about 1:3 to 1:1.5.

12. The method of claim 11 in which said resistance welding the strands of said body into a unitary, coherent mass utilizes direct electric current of about 30 to 50 milliseconds duration, at about 1000 to 1200 amps and about 3 to 5 volts.

13. The method of claim 12 in which said large diameter wire is flattened during said resistance welding of the strands of said body into a unitary, coherent mass at a pressure of about 1,000 to 4,000 psi per square inch.

14. The method of claim 13 in which said electrical resistance welding of the unitary, coherent mass to the relatively small diameter wire utilizes a electrical pulse having an energy of about 200 to 300 watt seconds.

15. The method of claim 10 in which the outer portions of the coherent mass are cut away to reduce the second transverse dimension to a value that approximates the corresponding dimension of said relatively small diameter wire.

16. The method of claim 1 in which the outer portions of the coherent mass are cut away to reduce the second transverse dimension to a value that approximates the corresponding dimension of said relatively small diameter wire.

* * * * *